Aug. 26, 1930.  H. P. BRAEUTIGAM  1,774,313
REFRIGERATING APPARATUS
Filed March 31, 1930   2 Sheets-Sheet 1

INVENTOR
Henry P. Braeutigam
BY
Spencer, Hardman and Fehr
ATTORNEY

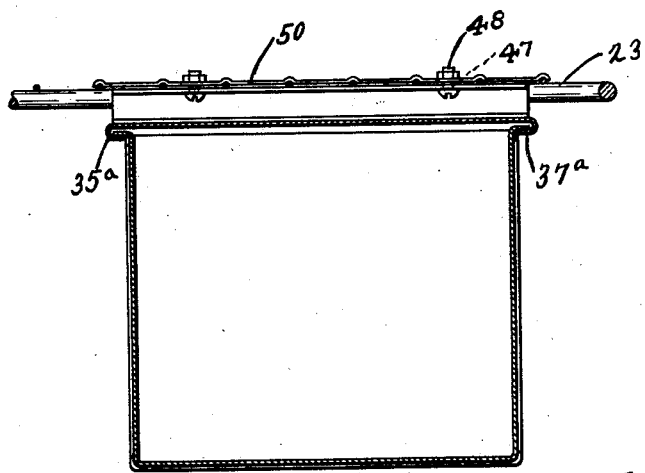
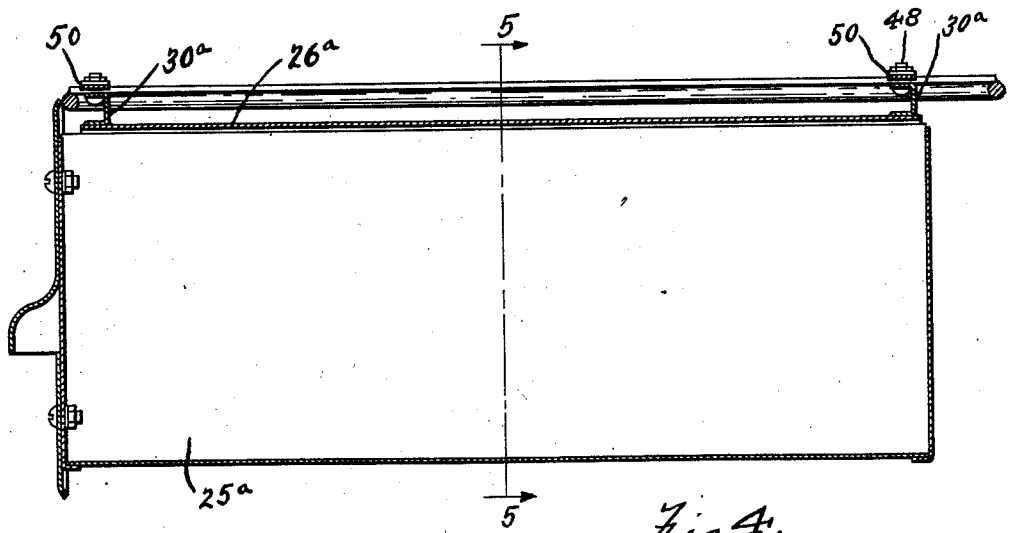

Patented Aug. 26, 1930

1,774,313

UNITED STATES PATENT OFFICE

HENRY P. BRAEUTIGAM, OF DAYTON, OHIO, ASSIGNOR TO FRIGIDAIRE CORPORATION, OF DAYTON, OHIO, A CORPORATION OF DELAWARE

REFRIGERATING APPARATUS

Application filed March 31, 1930. Serial No. 440,562.

This invention relates to refrigerating apparatus and more particularly to domestic mechanically cooled refrigerators provided with means for storing and preserving green vegetables or the like.

An object of this invention is to provide the mechanical refrigerator, for instance of the household type, with means for storing green vegetables so that their original crispness may be retained or restored.

Further objects and advantage of the present invention will be apparent from the following description, reference being had to the accompanying drawings, wherein a preferred form of the present invention is clearly shown.

In the drawings:

Fig. 4 is a view in cross-section and showing a receptacle of the type shown in Fig. 2 with the closure means and support for the receptacle being removable from the cabinet; and Fig. 5 is a view in cross-section taken along the line 5—5 of Fig. 4.

Figure 1:
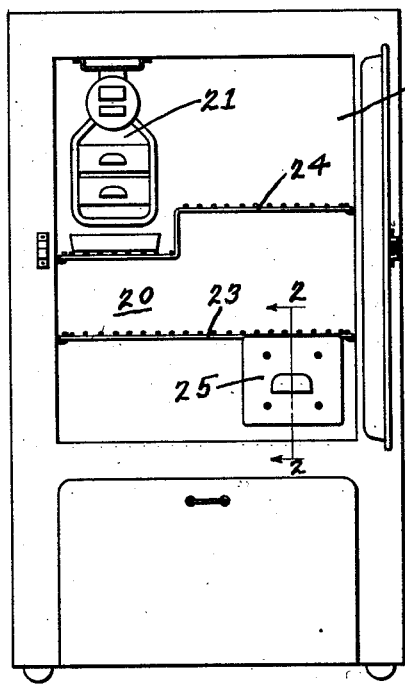
Fig. 1 is a front view in elevation of a refrigerator embodying features of this invention.
Figure 3:
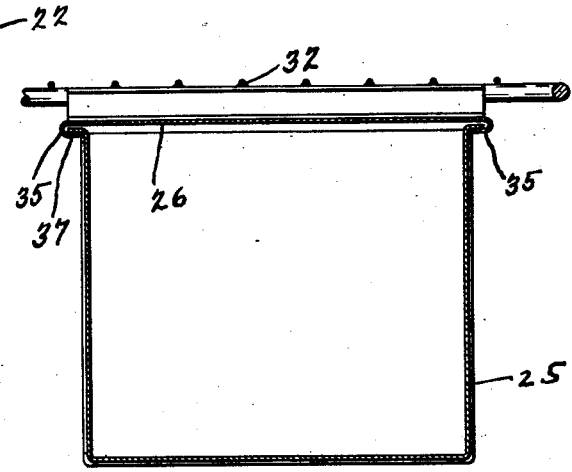
Fig. 3 is a vertical cross-section taken along the line 3—3 of Fig. 2.

Refrigerating apparatus embodying features of this invention may include refrigerating apparatus, generally designated as 20 which may be a mechanical refrigerator of the domestic type. Thus it may include a mechanical cooling unit, for instance of the evaporator type, generally designated as 21. This unit may be provided with refrigerant which provides temperatures below the temperature of melting ice. The refrigerator may also include a cooling chamber or compartment 22 which may be provided with one or more shelves 23 and 24. In a structure of this kind air circulates within the cooling chamber or compartment 22 and passes in contact with the mechanical cooling unit 21. This action and subsequent reheating of the air in its circulation reduces the humidity or moisture content of the air to such an extent that articles placed in the compartment are liable to have an injurious amount of moisture evaporated therefrom. This is particularly true with respect to green vegetables, such as lettuce, celery, radishes, carrots and the like.

Means may be provided in the refrigerator to store such vegetables as those enumerated above, so that their original crispness is maintained or restored. Thus a receptacle 25 may be provided, which receptacle includes a cover 26 so that the circulation of air between the receptacle and compartment is materially reduced. Preferably the receptacle is adapted to be suspended under one of the shelves, for instance the shelf 23, and for this purpose means for so suspending the receptacle may be provided. This means may include the cover 26 and transverse U-shaped strips 30 at either end of the cover 26. The U-shaped strips 30 may be secured along one flat side thereof to the cover, and the parallel side of the U-shaped member being secured to wires 32 of the shelf 23. The U-shaped strip 30 may be secured to the cover 26 and wires 32 in any suitable manner preferably by solder.

The cover may be separate from the receptacle 25. Preferably the cover is adapted to form slideways for the receptacle 25 which permits the receptacle to be slidably removable from the cabinet while the cover therefor remains stationary. Thus the cover 26 may be provided with downwardly and inwardly directed flanges 35 which provide slideways for the outwardly directed flanges 37 of the uppermost portion of the receptacle 25. Thus the curled flanges 35 permit the receptacle to be slid along said flanges with the outwardly directed flanges 37 resting upon the flange 35. Thus it will be noted that the cover 26 is attached to the shelf 23 and that said cover also provides a slideway and a support for the receptacle 25.

Figure 2:
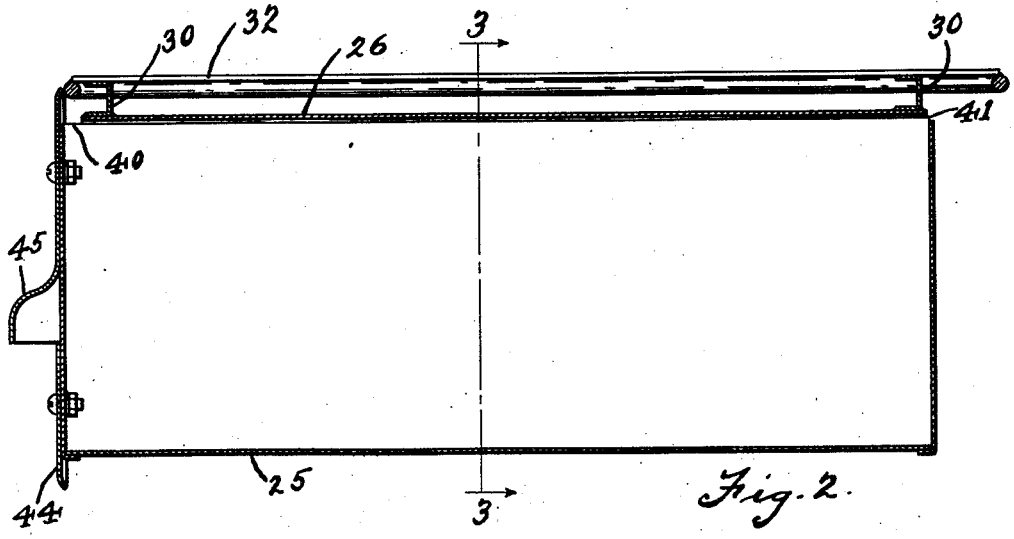
Fig. 2 is an enlarged view in cross-section taken along the line 2—2 of Fig. 1.

Ventilating means for providing a restricted circulation between the inner part of the receptacle 25 and the compartment 22 may be provided. This is accomplished by limiting the size of the cover 26. Thus the cover 26 substantially covers the receptacle 25 and provides a restricted ventilation of the proper proportion through opening 40 at the upper front part of the receptacle and through opening 41 at the upper rear part of the receptacle. As shown in Fig. 2 the receptacle is provided with a front plate 44 which forms a handle 45 for pulling the receptacle out from under the shelf. It will also be noted that when the receptacle is placed under the shelf 23 that the front plate 44 engages the outer wire of the shelf 23 when the receptacle is in its proper position. Thus it will be noted that a proper restricted ventilation will be obtained.

Referring to Figs. 4 and 5 there is shown another form for supporting the receptacle and its cover to the shelf 23. In this particular embodiment receptacle 25$^a$ corresponds to the receptacle 25 and includes a cover 26$^a$ which corresponds to the cover 26. The cover 26$^a$ is arranged for forming slideways 35$^a$ while the receptacle 25$^a$ is provided with cooperating outwardly directed flanges 37$^a$. Thus it will be noted that the cover 26$^a$ provides slideways for the receptacle 25$^a$ which slideways also support the receptacle 25$^a$. A U-shaped strip 30$^a$ similar to the U-shaped strip 30 is secured to each end of the cover 26$^a$ preferably by solder. The parallel side of each of the U-shaped strips 30$^a$ is provided with apertures 47 through which bolts 48 extend. The bolts 48 are employed for clamping the U-shaped strip 30$^a$ to the shelf 23. In this instance the bolts may clamp the one side of the U-shaped member to the underside of the shelf 23 and may be supported on the shelf by strips 50 placed on the upper side of the shelf 23 through which the bolts 48 extend to thus clamp the strips 50 and U-shaped strips 30$^a$ to said shelf.

The preferred method of utilizing the receptacles 25 or 25$^a$ for the storing of vegetables is to wash the vegetables, and while a certain amount of free moisture remains on the vegetables to place them in the receptacle 25 or 25$^a$ under the shelf 23 by sliding the outwardly directed flanges formed by the shelf onto the slideways provided by the cover. It has been found that with a limited circulation through the ventilation means, the original crispness of the vegetables is retained or restored. The construction preferably is such that with a cooling unit of the float controlled type such as shown in the patent to R. G. Osborn, No. 1,556,708, issued October 13, 1925, and with the cooling unit maintained at 20° F. so that the air circulating around receptacle 25 is at 45° F., satisfactory results are maintained if the ventilating means permits the daily evaporation of approximately 1/500 by weight of the maximum vegetable content of the receptacle 25. Thus if the receptacles 25 or 25$^a$ are adapted to contain 5 pounds of vegetables, with the temperature conditions above indicated it has been found that 1/100 of a pound of moisture may be evaporated daily from the contents of the receptacle and that under such conditions the original crispness of the vegetables is retained, or even restored unless the vegetables have become unduly wilted before being placed in the receptacle so that their cells have been destroyed.

The size of the receptacle 25 is such that its length is sufficient to accommodate celery of ordinary size, and its width and depth is sufficient to accommodate vegetables such as head-lettuce or the like.

While the conditions and amount of evaporation herein stated give satisfactory results in the preservation of the original crispness of the vegetables for extended periods of time, it will be understood that the example given is merely illustrative and that the best proportion and arrangement of parts varies with the temperatures found in the refrigerator evaporator and compartment, the direction and force of the air circulation therein, the location of the receptacle, and also the nature of the contents of the receptacle. Since there is a variation in the moisture content of so called wet foods and vegetables the conditions for their best preservation vary somewhat, those of greater moisture content being preserved better in an atmosphere of correspondingly higher moisture content the conditions being generally favorable for food preservation when the moisture content of the atmosphere is slightly less than the moisture content of the food so that the rate of loss of moisture from the food to the atmosphere is small. In the case of assorted foods of different moisture content the proportion and arrangement of the parts may as a practical matter be made such as to provide an atmosphere within the receptacle of moisture content in the neighborhood or preferably slightly less than the moisture content of that wet food having the lowest moisture content, whereby the moisture loss, while different for the different foods, is yet small as compared to the loss in the case of the same foods exposed to the cold comparatively dry atmosphere of the refrigerator compartment.

The atmospheric or air conditions herein described as desirable within the receptacle for the preservation of foods may, for convenience, be herein referred to generally as a condition of moisture equilibrium. It will be understood that the condition of moisture equilibrium or relationship between the moisture contents of the food and the atmosphere may deviate from that herein described as most favorable by modification of the restricted ventilation to the receptacle, and other factors, and that the benefits of the invention may be secured to varying degrees according to the extent to which the teachings thereof are embodied in the actual construction. Thus, increasing the circulation of air in the receptacle has the effect of reducing the moisture content of the air therein and of accelerating the loss of moisture from the food and consequently the drying thereof, and while there may be a considerable increase in circulation resulting for example in a reduction of the time for the satisfactory preservation of wet foods from, say, four weeks to, say, two weeks, it is found that further increase of air circulation results in greater drying of food and generally unsatisfactory operation. On the other hand, a decrease in air circulation tends to give a condition of greater moisture contents in the air of the receptacle, and while some variation may be made in this direction, the extent or percent thereof is much less than the permissible variation towards increased circulation, because increasing the moisture content of the air is likely to cause condensation of moisture on some of the foods and has the undesirable effect of accelerating bacteria and mold growth thus shortening the length of time for the satisfactory storage of foods.

While the form of embodiment of the invention as herein disclosed, constitutes the preferred form, it is to be understood that other forms might be adopted, all coming within the scope of the claims which follow.

What is claimed is as follows:

1. A refrigerating apparatus comprising means forming a food compartment and refrigerating means arranged for operation at a temperature below 32° F. for cooling the air circulating within said compartment, a shelf in said compartment, receptacle means for storing vegetables disposed in the path of the circulating air, said receptacle means comprising a cover portion having provisions for supporting the cover from the shelf, and a pan portion cooperating with said cover portion and having provisions for movably suspending the same from the cover portion, said receptacle means having provisions for permitting restricted air circulation between the compartment and the interior of the receptacle means whereby to provide within the latter a condition of moisture equilibrium for vegetables stored therein, substantially as described.

2. A refrigerating apparatus comprising means forming a food compartment and refrigerating means arranged for operation at a temperature below 32° F. for cooling the air circulating within said compartment, a shelf in said compartment, receptacle means for storing vegetables disposed in the path of the circulating air, said receptacle means comprising a pan portion and a cover portion therefor, means for suspending the cover portion from the shelf, cooperating means on the cover and the pan portions for slidably suspending the pan portion from the cover portion, said receptacle means having provisions for permitting restricted air circulation between the compartment and the interior of the receptacle means whereby to provide within the latter a condition of moisture equilibrium for vegetables stored therein, substantially as described.

3. A refrigerating apparatus comprising means forming a food compartment and refrigerating means arranged for operation at a temperature below 32° F. for cooling the air circulating within said compartment, a shelf in said compartment, receptacle means for storing vegetables disposed in the path of the circulating air, said receptacle means comprising a pan portion and a cover portion therefor, means for suspending the cover portion from the shelf, inturned lips on the cover portion and outturned lips on the pan portion forming cooperating shoulders for slidably suspending the pan portion from the cover portion underneath the shelf, stop means for limiting the sliding movement of the pan portion relatively to the cover portion, said receptacle means having provisions for permitting restricted air circulation between the compartment and the interior of the receptacle means whereby to provide within the latter a condition of moisture equilibrium for vegetables stored therein, substantially as described.

4. A refrigerating apparatus comprising means forming a food compartment and refrigerating means arranged for operation at a temperature below 32° F. for cooling the air circulating within said compartment, a shelf in said compartment, receptacle means for storing vegetables disposed in the path of the circulating air, said receptacle means comprising a rectangular pan portion and a cooperating rectangular cover portion therefor, means for securing the cover portion against the lower side of the shelf comprising a clamp engaging the upper side thereof, inturned flanges formed on the cover portion providing a slide for the pan portion, and outturned flanges on the pan portion cooperating with said inturned flanges for suspending the pan portion from the cover portion, said receptacle means having provisions for permitting restricted air circulation between the compartment and the interior of the receptacle means whereby to provide within the latter a condition of moisture equilibrium for vegetables stored therein, substantially as described.

In testimony whereof I hereto affix my signature.

HENRY P. BRAEUTIGAM.